United States Patent [19]

Smiley et al.

[11] Patent Number: 5,397,272
[45] Date of Patent: Mar. 14, 1995

[54] BRAIDED COMPOSITE SHAFT WITH YOKE MEMBER

[75] Inventors: Anthony J. Smiley, Wilmington, Del.; Michael H. Higgins, Pasadena, Md.; Frank G. Scholley, Virginia Beach, Va.

[73] Assignee: Pressure Technology, Inc., Hanover, Md.

[21] Appl. No.: 14,803

[22] Filed: Feb. 8, 1993

[51] Int. Cl.$^6$ ............................................. F16C 3/02
[52] U.S. Cl. .................................. 464/181; 138/109; 156/148; 156/172; 464/183
[58] Field of Search .................. 464/181, 182, 183; 138/109, 123, DIG. 2; 156/148, 172, 166, 180; 74/579 R; 57/202, 122; 87/1, 9, 13; 428/34.5, 36.1, 36.3, 36.9

[56] References Cited

U.S. PATENT DOCUMENTS

| | | | |
|---|---|---|---|
| 3,592,884 | 7/1971 | Williams | 464/181 X |
| 4,325,174 | 4/1982 | Smith et al. | 156/172 |
| 4,568,314 | 2/1986 | Krude | 464/181 |
| 4,605,385 | 8/1986 | Puck et al. | 464/181 |
| 4,681,556 | 7/1987 | Palmer et al. | 464/181 |
| 4,704,918 | 11/1987 | Orkin et al. | 464/181 X |
| 4,992,313 | 2/1991 | Shobert et al. | 74/579 X |

Primary Examiner—Daniel P. Stodola
Assistant Examiner—Eileen A. Dunn
Attorney, Agent, or Firm—Griffin, Butler, Whisenhunt & Kurtossy

[57] ABSTRACT

A braided fiber reinforced composite shaft with yoke member of a universal joint (8) having a tubular portion (10) integrally connected with the yoke portion (12). The yoke portion (12) has a pair of opposed axially extending arms (20) which extend beyond the tubular portion (10). The yoke arms (20) contain diametrically opposed holes (22) centrally located and near the end of each arm (20). A portion of the braided fiber reinforcement extends continuously around the tubular portion (10), into the axially extending arms, around the respective holes (22) and back around the tubular portion (10).

10 Claims, 6 Drawing Sheets

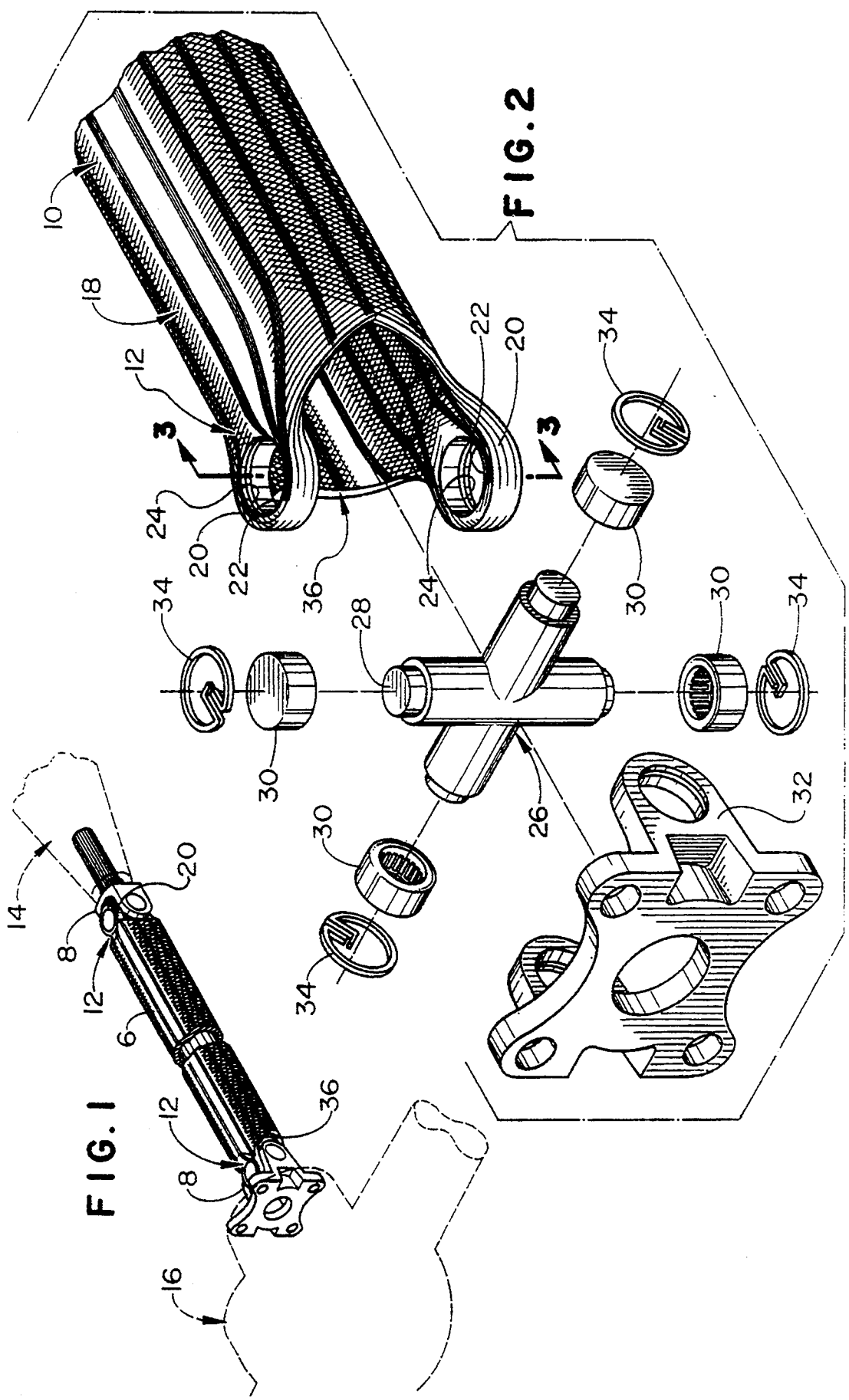

BRAIDED COMPOSITE SHAFT WITH YOKE MEMBER

BACKGROUND—FIELD OF INVENTION

This invention relates to braided composite (fiber reinforced matrix material) shafts, more specifically to the construction of a combined shaft and yoke member of a universal joint assembly.

BACKGROUND—DESCRIPTION OF PRIOR ART

Fiber reinforced composite drive shafts have been developed to provide a lightweight, efficient means for transferring torque. The improved structural dynamics of a composite shaft facilitate the use of higher rotational speeds and longer single drive shaft systems that allow for the elimination of parts. To be functional in a universal joint assembly, these shafts required attachment to a yoke member. Initial efforts simply employed the adhesive bonding of a metallic yoke to the ends of a composite shaft. This approach is expensive due to the added step of bonding the yoke. In addition, the weight of the metal yoke eliminated many of the advantages provided by the lightweight composite shaft.

The yokes of a universal joint must be designed in such a way that the arms of the yokes will safely withstand the shear and radial forces occurring during torque transmission. Efforts to integrate a composite yoke and shaft have been successful, but not without compromises in performance, applicability, or simplicity due to this demanding requirement.

U.S. Pat. No. 4,325,174 to Smith (1982) shows a tubular composite drive shaft with thickened ends. The ends of the shaft contain diametrically opposed bores which receive beating cups supporting the trunnions of a universal joint cross member. The full cylindrical end geometry provides the rigidity necessary to accommodate high torque loads. It does so however, by employing a relatively large diameter (larger than would be necessary for torque transmission) or by limiting the angle of articulation of the universal joint. In addition, Smith's composite drive shaft limits the design of the joint cross member to pairs of trunnions of different lengths. Thus, the design of the cross member cannot be optimized.

In another approach, U.S. Pat. No. 4,568,314 to Krude (1986) discloses a composite universal joint shaft assembly with ends that have a pair of opposed axially extending arms that make up the yoke. The arms contain diametrically opposed bores which receive bearing cups supporting the trunnions of a universal joint cross member. A reinforcing member extends between and attaches to the arm portions to provide support during loading. The use of a reinforcing member requires an additional manufacturing step and material, both of which add cost. In addition, the reinforcing member constrains the angular articulation to some degree and complicates the assembly and disassembly of the universal joint.

A slightly different approach is put forth by Palmer in U.S. Pat. No. 4,681,556 (1987), which discloses a composite shaft with yoke member assembly with a yoke member produced by winding fibers over a thin metallic sleeve. The metal sleeve is shaped to contain diametrically opposed bores for receiving bearing cups and a flanged cutout to facilitate angular articulation of the universal joint at the shaft end. The fabrication of the metallic yoke creates additional manufacturing steps and adds material, both of which add cost.

Both Krude and Palmer state that filament winding of the fiber reinforcement around the bore in the yoke is required to obtain the most effective fiber architecture. Filament winding of this type can only be performed with at most a single fiber tow. Therefore, the time required to produce this optimum fiber architecture is much longer than that required of a braiding process to produce a similar fiber architecture. In addition, the filament winding process is not capable of placing axially aligned fibers along the length of the shaft. This limits the dynamic performance of the shaft.

U.S. Pat. No. 3,592,884 to Williams (1971) discloses a method for employing a braiding process to manufacture a composite shaft for a universal joint assembly. A metallic yoke member is integrated into the assembly through mechanical interlocking and adhesive bonding of the resin matrix in the composite shaft to the ends of the yokes. There are no fiber reinforcements that extend from the shaft into the arms of the yoke. Therefore, load transfer is not efficient. In addition, the use of discrete end pieces for yokes adds weight and requires additional manufacturing steps which add cost.

OBJECTS AND ADVANTAGES

Accordingly, several objects and advantages of the present invention are:
a. to provide a composite shaft with yoke member that ensures a sufficiently large angle of possible articulation of the universal joint.
b. to provide a composite shaft with yoke member that will allow use with any standard universal joint or trunnion design, such as for a Hookes type joint.
c. to provide a composite shaft with yoke member that does not require the use of external reinforcing members or attachments.
d. to provide a composite shaft with yoke member with an overall geometry similar to that of a standard metallic universal joint, thus allowing for the use of standard assembly and disassembly techniques.
e. to provide a composite shaft with yoke member that is a single integrated assembly thus reducing part count and cost.
f. to provide a composite shaft with yoke member that consists of biaxially or triaxially oriented fibers with off-axis reinforcement providing shear stiffness and longitudinally aligned fibers providing bending stiffness. This facilitates both high torque transfer and high dynamic speeds.
g. to provide a composite shaft with yoke member that is formed naturally as a result of a braiding process and therefore does not require any post-process machining.
h. to allow a method of manufacturing a composite shaft with yoke member that is very rapid and therefore relatively low in cost.

Further objects and advantages of the present invention will become apparent from a consideration of the drawings and ensuing description.

DRAWING FIGURES

In the drawings:
FIG. 1 shows a braided composite drive shaft as it would be placed in service, between a vehicle transmission and rear axle;

FIG. 2 illustrates the attachment of a composite drive shaft with yoke member in a universal joint assembly;

Figure 4:
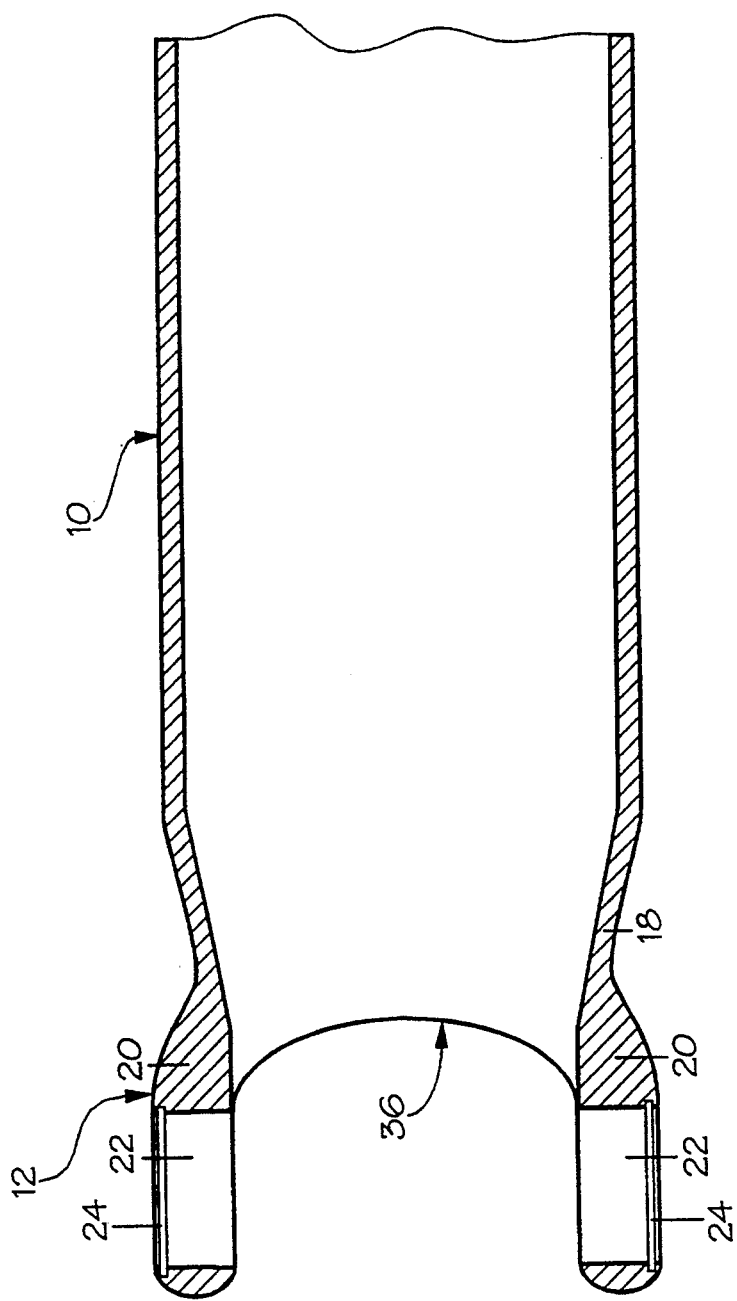
FIG. 4 shows a side sectional view through 4—4 of FIG. 3 showing a braided composite shaft with yoke member with an inward sloping transition from shaft to yoke.
Figure 6:
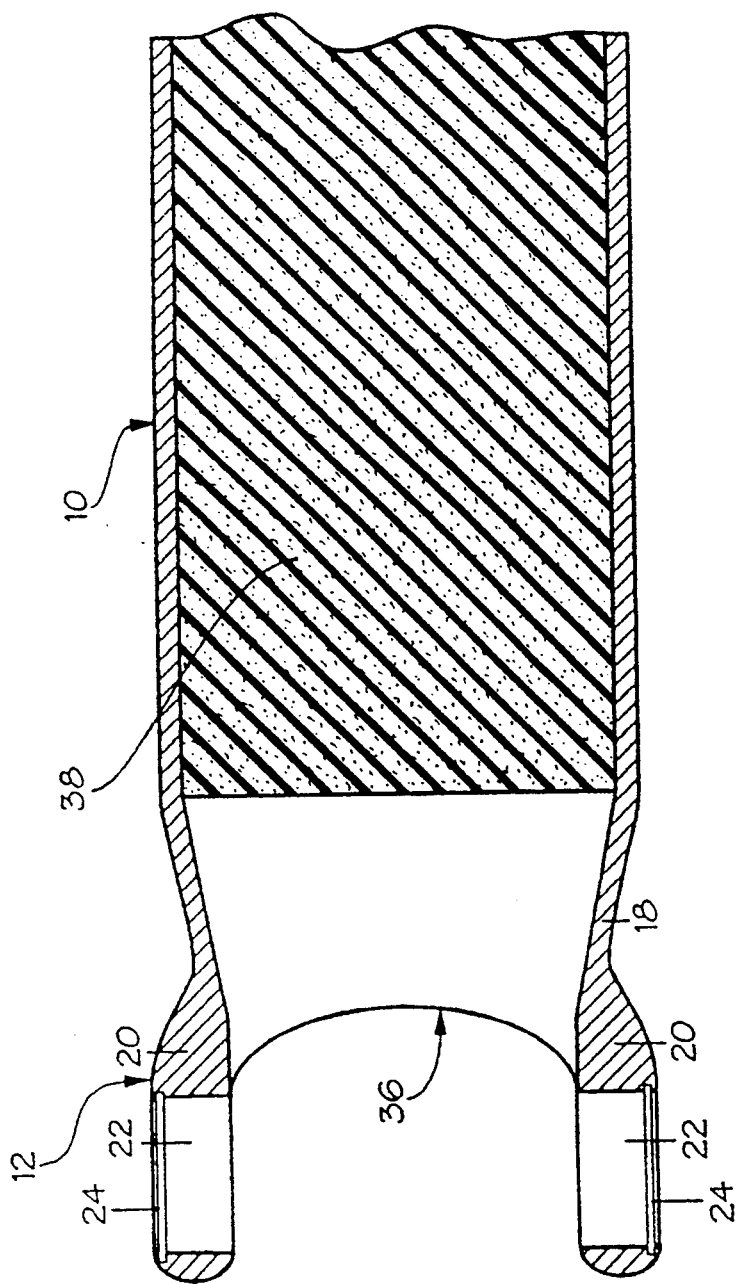
Figure 7:
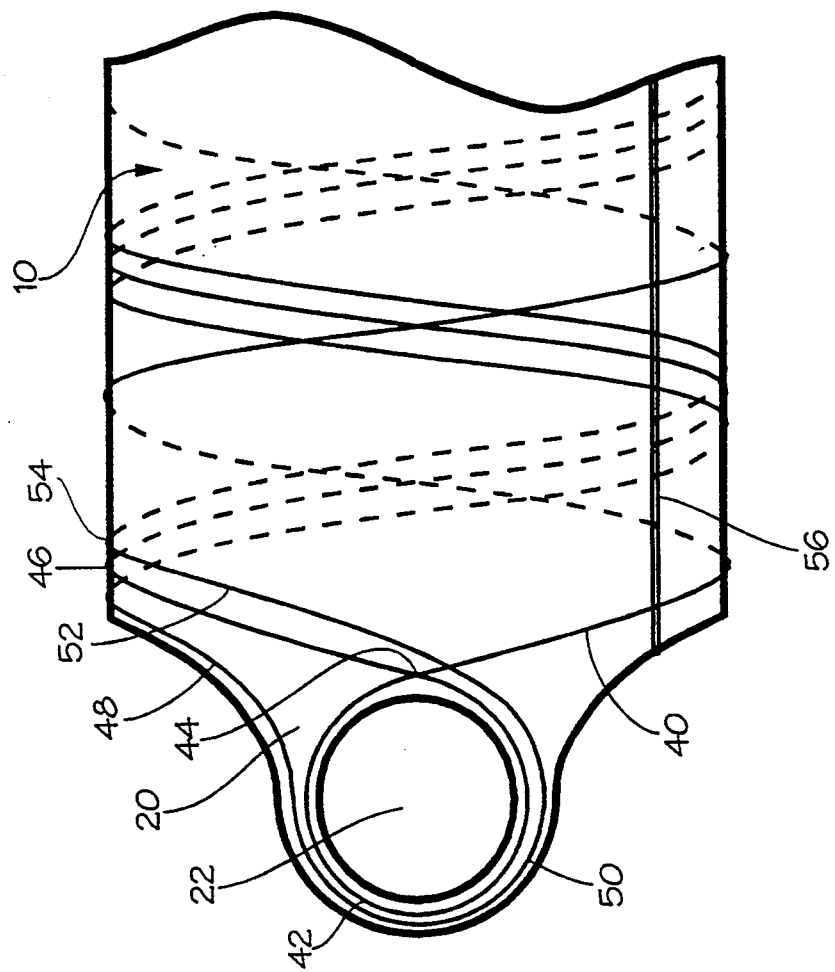

FIG. 6 also shows an alternate embodiment of FIG. 4 where the tubular shaft is filled; and FIG. 7 shows the typical laydown path of the fiber yarns in a braided composite shaft with yoke member.

DESCRIPTION—FIGS. 1 TO 7

The manner of using the present invention is identical to that for drive shaft assemblies in present use. A typical embodiment of a braided composite drive shaft is shown in FIG. 1 as it would be placed in service. The composite shaft with yoke member 6 is connected to universal joints 8 through its yoke arms 20 to a vehicle transmission 14 at one end and a vehicle rear differential 16 at its other end. The essential purpose of the composite shaft with yoke member 6 is to facilitate power transmission from a driving element to a driven element as shown.

The geometric shape of the yoke portion 12 allows for attachment to a universal joint using standard assembly procedures. The naturally formed opening between the yoke arms 36 facilitates angular rotation in the universal joint 8 that may be caused by misalignment of the mechanical elements 14,16. It is a single integrated assembly with no external attachments or reinforcements required for operation, which may constrain the performance of the assembly.

Figure 3:
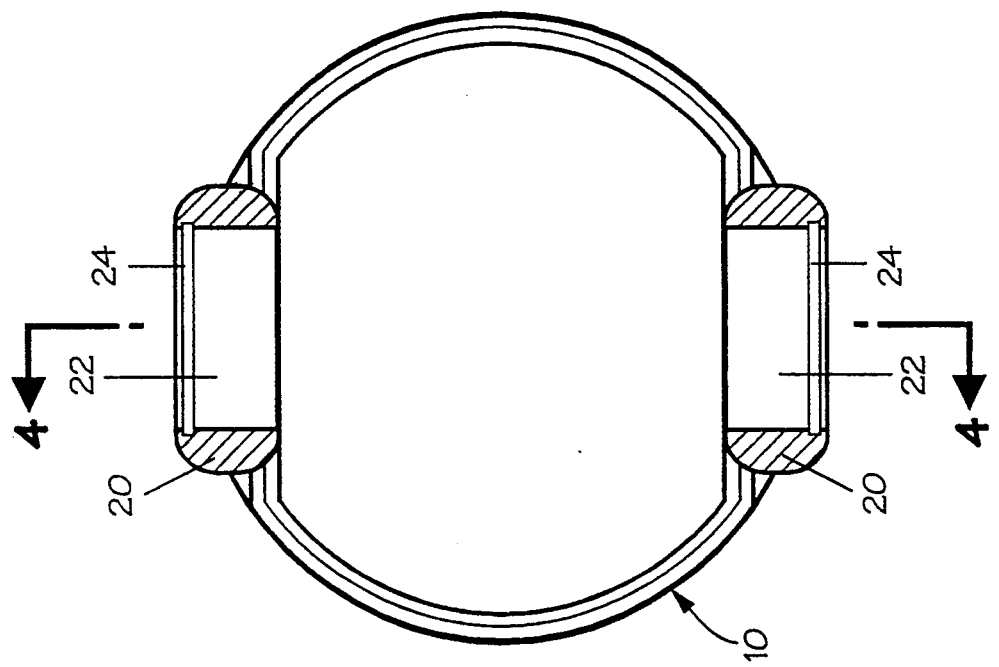
FIG. 3 shows a top sectional view through 3—3 of FIG. 1.

The braided composite shaft with yoke member 6 is illustrated in detail in FIG. 2 as a perspective view and FIG. 3 in section view. It consists of a number of braided fibers impregnated with a matrix material that upon placement and processing result in a tubular portion 10 integrally connected at one or both ends to a yoke portion 12. The tubular portion 10 may consist of; any hollow geometric configuration including variable crossections without limitation in length. The tubular portion 10 and the yoke portion 12 are connected through a transition portion 18. The transition portion 18 provides a smooth transformation of the braided reinforcement from a tubular portion 10 to a pair of diametrically opposed yoke arms 20 axially extending from the transition portion 18. Centrally located near the end of each arm is a hole 22. The holes 22 of each pair of yoke arms are aligned with one another in an opposed relationship. The holes 22 contain internal circumferential grooves 22 which are provided for receiving spring clips 34 by which bearing cups 30 are retained in the holes 22, for supporting trunnions 28 of a cross member 26 of a universal joint. Alternatively, the bearing cups 30 could be adhesively bonded in place and the holding grooves 24 could be eliminated. The braided architecture of the yoke arms 20 results in naturally formed openings 36 along the sides of the yoke portion 12 adjacent to and between the yoke arms 20. The openings 36 accommodate the other trunnions 28 of the cross member 26 and transmission yoke 32 of the joint when assembled.

Figure 5:
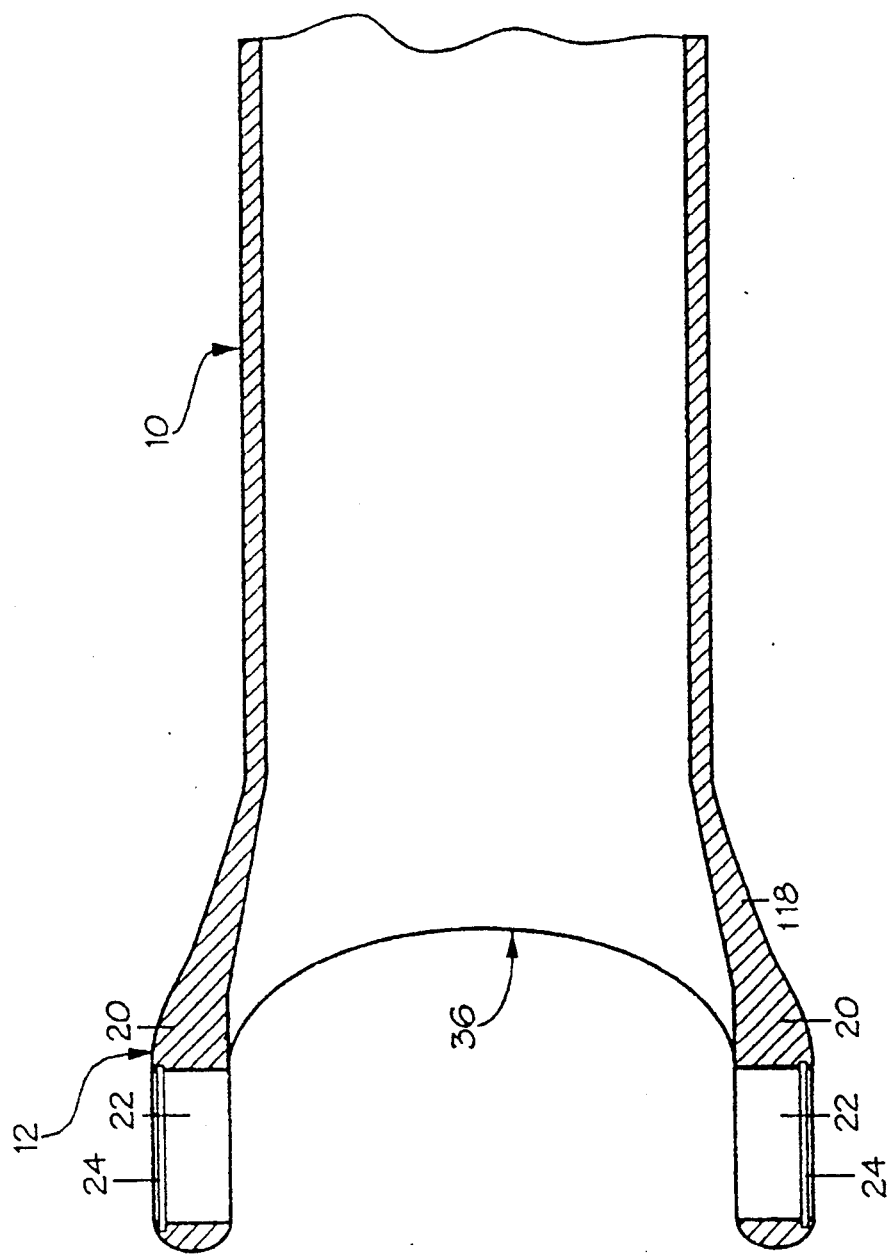
FIG. 5 shows an alternate embodiment of FIG. 4 with an outward sloping transition from shaft to yoke.

The transition portion 18 may be sloped inward, as shown in the embodiment of the invention illustrated in FIG. 4, or outward as shown by transition portion 118 in an alternative embodiment of FIG. 5. This will depend upon the geometry of the universal joint to which the yoke member 12 is attached.

A further embodiment of the present invention is shown in FIG. 6. In the embodiment of FIG. 6, there is provided a braided composite shaft with yoke member with a tubular portion 10 that contains filler material 38. The filler material 38 may be composed of any substance which might provide a performance benefit such as foam for vibration damping or structural stability.

Typical reinforcement fiber yarn paths in a braided composite shaft with yoke member are illustrated in FIG. 7. The braid yarns wind along the tubular shaft portion 10 in a helical path. Around the hole 22 there are two distinct paths for the braid yarns. These include a crossover yarn 40 path and a return yarn 48 path. The crossover yarn 40 comes around the tubular shaft 10 and winds around 42 the hole 22 and crosses over itself 44 before returning back to a helical pattern 46 around the tubular shaft 10. The return yarn 48 comes off the tubular shaft 10 and also winds around 50 the hole 22 and then transitions 52 back to the helical path upon which it previously traveled. Longitudinal yarns may be employed to improve axial or bending stiffness of the tubular shaft 10. The longitudinal yarns simply traverse along the length 56 of the tubular shaft 10. The longitudinal fiber yarns 44 are held in place by the interlacing of the braid yarns 42. This type of triaxial reinforcement architecture provides both shear stiffness and bending stiffness which facilitates the transmission of high torque loads at very high dynamic speeds.

The braided composite which makes up the assembly consists of any number of successive layers of braided fiber reinforced matrix composite. The reinforcement fibers in each layer may be placed at a variety of orientation angles depending upon the requirements of a specific application. The fibers may be any combination of glass fibers, carbon fibers, polymeric fibers, or metallic fibers. The matrix material may be a thermosetting polymer (e.g.—epoxy, polyester, vinylester, etc.), a thermoplastic polymer (e.g.—Nylon, PEI, PES, etc.), a ceramic, or a metal. In addition, the matrix may be post processed at high temperatures to produce a carbon matrix composite.

METHOD OF MANUFACTURE

The general method of manufacture of a braided composite shaft with yoke member employs a circular braider to lay fiber yarns onto a rigid mandrel, however, a filament winding process could be utilized to produce the article of invention. Circular braiding represents a very rapid and therefore cost effective means for placing fiber reinforcement. Circular braiding has existed and been in use for over a century and thus does not require any detailed discussion.

The complete braided composite shaft with yoke member is produced by placing successive layers of fiber reinforcement over a rigid mandrel at the orientation angles required by the desired application. The fiber yarns may be preimpregnated with a matrix material or the matrix material may be introduced as an intermediate or final step in the manufacturing operation. Once the braiding is complete and the fibers are impregnated with the matrix material, the assembly is processed to complete the fiber wet-out, remove voids, and harden the matrix. The mandrel is then removed resulting in a single integrated shaft and yoke assembly.

The mandrel can be removed using any one of a number of existing mandrel removal techniques such as: extractable interlocking sections; wash out systems; or hydraulic mechanical extraction devices.

CONCLUSION, RAMIFICATIONS, AND SCOPE OF INVENTION

Accordingly, the reader will see that the braided composite shaft with yoke member of this invention provides the flexibility of a similar metallic assembly and the enhanced performance characteristics of lightweight fiber reinforced composite materials. The general shape of the yoke of this invention allows for: sufficiently large angle of possible articulation of an attached universal joint; use with any standard Hookes universal joint or trunnion design; and standard assembly and disassembly techniques. The braided fiber reinforcement architecture results in a shaft with yoke member that: facilitates high torque transfer and high dynamic speeds; is a single integrated assembly, does not require any additional external reinforcing members or attachments, and is naturally formed using a braiding process and therefore does not require any post-process machining. In addition, the braiding process employed in the manufacture is a very rapid and therefore cost effective manner of producing a composite shaft with yoke member assembly.

Although the description above contains many specificities, these should not be construed as limiting the scope of the invention but as merely providing illustrations of some of the presently preferred embodiments of this invention. For example, the shaft with yoke member may be employed in any mechanical element that requires a tubular shaft be connected to another mechanical element through a pair of extending arms such as a strut in a support frame. Another use may incorporate the use of a flexible matrix material in the tubular shaft to create a torsion spring. Furthermore, the integrated shaft with yoke member could be employed in medical fixation devices such as knee braces that require overall torsional rigidity and angular articulation at the knee joint.

Thus the scope of the invention should be determined by the appended claims and their legal equivalents, rather than by the examples given.

What is claimed is:

1. A unitary one-piece composite shaft constructed of matrix material reinforced with fibers includes a tubular portion integrally formed with a yoke portion, the yoke portion having a pair of opposed axially extending arms formed at least one end of said shaft the arms extending beyond said tubular portion and defining a pair of diametrically opposed holes, one hole formed in each of said axially extending arms, at least some of the fibers continuously extending: around said tubular portion in a helical direction, into an axially extending arm, around a hole in said axially extending arm to form an incomplete loop thereabout, and back into and around said tubular portion in the same helical direction.

2. The shaft according to claim 1, wherein substantially all said fibers which extend continuously around said tubular portion in a helical direction, also extend into an axially extending arm, loop around a hole therein, and extend back into and around said tubular portion.

3. The shaft according to claim 1, wherein some of said fibers continuously extend about said tubular portion in a helical direction, into said yoke portion, around a respective hole to form a complete loop thereabout, and back to said tubular portion to extend therealong in an opposite helical direction.

4. The shaft according to claim 1, wherein some of said fibers extend continuously and axially along said tubular portion and into said yoke portion without extending about either of said holes.

5. The shaft according to claim 1, wherein said pair of axially extending arms include arm portions extending parallel to each other toward the one end of the shaft and transition portions angling inwardly toward each other from said tubular portion.

6. The shaft according to claim 1, wherein said pair of axially extending arms include portions extending parallel to each other toward the one end of the shaft and transition portions angling outwardly away from each other from said tubular portion.

7. The shaft according to claim 1, wherein said tubular portion has a filling therein.

8. The shaft according to claim 1, wherein said shaft with yoke portion are made by a biaxial braiding process.

9. The shaft according to claim 1, wherein said shaft with yoke portion are made by a triaxial braiding process.

10. The shaft according to claim 1, wherein said shaft with yoke portion are made by a filament winding process.

* * * * *